United States Patent [19]
Gerharz et al.

[11] Patent Number: 5,635,566
[45] Date of Patent: Jun. 3, 1997

[54] PROCESS FOR PREPARING DISPERSIONS STABILIZED WITH PROTECTIVE COLLOID

[75] Inventors: Bettina Gerharz, Mainz; Matthias Kroggel, Kelkheim, both of Germany

[73] Assignee: Hoechst Aktiengesellschaft, Frankfurt am Main, Germany

[21] Appl. No.: 348,225

[22] Filed: Nov. 28, 1994

[30] Foreign Application Priority Data

Nov. 29, 1993 [DE] Germany ............... 43 40 563.0

[51] Int. Cl.⁶ ..................................... C08F 2/24
[52] U.S. Cl. .................. 525/291; 524/457; 524/458; 524/459
[58] Field of Search .................. 524/457, 458, 524/459; 525/291

[56] References Cited

U.S. PATENT DOCUMENTS

| | | | |
|---|---|---|---|
| 3,666,704 | 5/1972 | Keppler et al. | 260/29.6 WB |
| 3,762,987 | 10/1973 | Maruta et al. | 161/251 |
| 5,030,688 | 7/1991 | Misra et al. | 525/61 |
| 5,187,233 | 2/1993 | Ball et al. | 525/267 |

FOREIGN PATENT DOCUMENTS

| | | |
|---|---|---|
| 0 334 354 | 9/1989 | European Pat. Off. . |
| 0 368 832 | 5/1990 | European Pat. Off. . |
| 0 594 026 | 4/1994 | European Pat. Off. . |
| 0 849 006 | 9/1952 | Germany . |
| 222 882 | 5/1985 | Germany . |
| 54-135836 | 10/1979 | Japan . |

OTHER PUBLICATIONS

Translation of DE 0,849,006. Sep. 1952.
Puterman et al., "Latex Preparation and Stabilization by Hydrophobiccally Modified Hydroxyethyl Celluloses", J. Appl. Polymer Sci., vol. 40, (1990), pp. 333–343.
Daniel H. Craig, "The Synthesis of Hydroxyethyl Cellulose—Stabilized Acrylic Latexes", Polym. Mat. Sci. & Eng., vol. 51, No. 172, (1984), pp. 172–175.
Daniel H. Craig, "Effect of Hydroxyethylcellulose Molecular Content On Grafting Reactions of Vinyl Monomers During Latex Manufacture", J. Coat. Techn., vol. 61, vol. 779, (1989). pp. 49–53.
Odian, G. "Principles of Polymerization", New York, Wiley, 1991, 3rd Edition, p. 349.

Primary Examiner—Irina S. Zemel
Attorney, Agent, or Firm—Foley & Lardner

[57] ABSTRACT

Process for preparing dispersions stabilized with protective colloid using sulfonato-containing polyvinyl acetals as the protective colloid in the preparation of the dispersions, if desired in combination with additional emulsifiers or additional protective colloids. The dispersions exhibit a pH-dependent viscosity and are suitable, for example, for coating and bonding substrates and as rheology modifiers and binders and for use in solid paints.

23 Claims, No Drawings

PROCESS FOR PREPARING DISPERSIONS STABILIZED WITH PROTECTIVE COLLOID

BACKGROUND OF THE INVENTION

1. Field of the Invention

The present invention relates to a process for preparing dispersions stabilized with protective colloid using sulfonato-containing polyvinyl acetals as the protective colloid, and to the use of such dispersions, for example, in aqueous binder systems.

2. Description of Related Art

Dispersions are used in many areas of application, for example in the adhesives sector, in the building materials sector, for interior paints and gloss paints, exterior paints and wood glues. With dispersions, a distinction is made between systems stabilized with emulsifiers and those stabilized with protective colloids. Furthermore, a distinction must be made between ionically stabilized and nonionically stabilized dispersions.

For a multitude of processing methods, the dispersions used have to be extremely stable to shearing. Dispersions stabilized with emulsifiers usually do not meet this requirement. This is why dispersions stabilized with protective colloids are used, or at least used additionally.

Dispersions stabilized with protective colloid have been disclosed in "J. Appl. Polym. Sci.", Vol. 40, 333–343 (1990) and in "Polym. Mat. Sci. & Eng.", 51, 172 (1984). A process for emulsion polymerization of ethylenically unsaturated monomers in the presence of hydrophobically modified hydroxyethylcellulose is described in EP-A 0,334,354. However, hydrophobically modified hydroxyethylcelluloses have a tendency to form particle aggregates and to become destabilized, especially in pure acrylate dispersions ("J. Appl. Polym. Sci.", Vol. 40, 333–343, 1990). High grafting rates in the polymerization of acrylate monomers with cellulose ethers lead to insufficient film clarity and dilatancy of the dispersion ("J. Coat. Techn.", Vol. 61 (779), 49, 1989).

A further disadvantage of the known dispersions stabilized with protective colloids is that the desired viscosity for the application has to be adjusted afterwards by addition of thickeners, fillers or else by dilutions.

Often, stability of the dispersions thus adjusted is also problematical. In order to avoid coagulation or settling of the dispersions, specific recipes have to be developed each time depending on the additives used.

SUMMARY OF THE INVENTION

Accordingly, one object of the present invention is to provide a process for preparing dispersions which exhibit high stability to shearing and whose rheology can be adjusted in a simple manner over a wide range without exhibiting the disadvantages mentioned above.

Another object of the present invention is to provide an aqueous dispersion having a pH dependent viscosity. Still another object of the present invention is to provide a method of coating or bonding with an aqueous dispersion having a pH dependent viscosity. Yet another object of the present invention is to provide a rheology modifier for aqueous solutions and dispersions, and as a binder for systems such as solid paints and glue sticks.

In accomplishing the foregoing objects, there has been provided according to the present invention a process for preparing a latex dispersion stabilized with a protective colloid. The process includes: forming a dispersion of vinyl monomers and a protective colloid of sulfonato-containing polyvinyl acetals in a reaction system; and emulsion polymerizing the vinyl monomers in the presence of the protective colloid to produce the dispersion stabilized with the protective colloid. The present invention also provides an aqueous latex dispersion made by the process above.

Another aspect of the present invention provides an aqueous latex dispersion having a pH-dependent viscosity. The dispersion includes: a sulfonato-containing polyvinyl acetals as a protective colloid; and at least one latex polymer containing vinyl monomer units, wherein the sulfonato-containing poly vinyl acetals have vinyl monomers grafted thereto, and the grafted vinyl monomers are identical to at least one vinyl monomer unit of the at least one latex polymer.

Yet another aspect of the present invention provides a process for coating or bonding a substrate such as glass, metals, wood, paper, natural fibers, mineral materials and polymer substrates. The process includes applying a coating or bonding composition which contains the dispersion having a pH dependent viscosity of the present invention.

Still another aspect of the present invention provides a rheology modifier which contains the dispersion having a pH dependent viscosity of the present invention, and is added to an aqueous solution or dispersion.

Further objects, features and advantages of the present invention will become apparent from the detailed description of preferred embodiments which follows.

DETAILED DESCRIPTION OF THE PREFERRED EMBODIMENTS

It has now been found that dispersions whose viscosity can be adjusted within wide limits by adjusting the pH can be prepared during the polymerization process by adding sulfonato-containing polyvinyl acetal protective colloids.

Accordingly, the present invention provides a process for preparing dispersions stabilized with protective colloid using sulfonato-containing polyvinyl acetals as the protective colloid in the preparation of the dispersions. If desired, these dispersions can be prepared in combination with additional emulsifiers or further protective colloids. The sulfonato-containing polyvinyl acetals usable in the preparation of the dispersions are described, for example, in Patent Applications EP-A- 0,594,026 (equivalent to U.S. Ser. No. 138,121), DD-A 0,222,882 and EP-A 0,368,832 (equivalent to U.S. Pat. No. 5,030,688), the disclosures of which are hereby incorporated by reference in their entireties. Preference is given to the use of sulfonato-containing polyvinyl acetals described in Patent Application EP 0,594, 026. However, any suitable sulfonato-containing polyvinyl acetal may be used and those skilled in the art are capable of synthesizing a suitable sulfonato-containing polyvinyl acetal in accordance with the guidelines provided herein. Polyvinyl acetals suitable according to the invention possess a preferred weight average molecular weight ($M_w$) of about 1,000 to about 300,000 g/mol, in particular of about 2,500 to about 150,000 g/mol.

The protective colloids according to the present invention can be prepared by acetalization of sulfonato-containing polyvinyl alcohols with aldehydes or by acetalization of polyvinyl alcohols with sulfonato-containing aldehydes using methods known from the literature. Suitable aldehydes for acetalization are aliphatic, cycloaliphatic and aromatic aldehydes, having up to 20 carbon atoms. Preference is given to the use of acetaldehyde, propionaldehyde, i-nonanal, hydroxyalkanals having 2 to 8 carbon atoms and benzaldehyde, and particular preference being given to the use of butyraldehyde. If sulfonato-containing aldehydes are used for acetalization, sulfonated benzaldehydes are particularly suitable. Any other aldehyde suitable for acetalization may also be used.

The sulfonato-containing polyvinyl acetals to be used according to the invention generally contain up to about 70 mol % of vinyl alcohol units, up to about 84 mol % of vinyl acetal units, up to about 20 mol % of sulfonate units ($-SO_3$) and up to about 20 mol % of vinyl acetal units, and they preferably contain between about 25 and about 50 mol % of vinyl alcohol units, between about 35 and about 70 mol % of vinyl acetal units, between about 1 and about 15 mol % of sulfonate groups and between about 0 and about 3 mol % of vinyl acetate units. Moreover, the protective colloids according to the invention can contain up to about 20 mol % of other monomer units, for example styrene and styrene derivatives, ethylenically unsaturated carboxylic acids, esters thereof, amides thereof or anhydrides thereof having up to 25 carbon atoms, vinyl esters having up to 20 carbon atoms, n- and i-alkylvinyl esters, n-vinylpyrrolidones and derivatives thereof, acrylonitrile, olefins, vinyl ethers, preferably vinyl ester having up to 15 carbon atoms. Other suitable monomer units may also be used.

When preparing the dispersions, the protective colloids are generally used according to the invention in an amount of up to about 25% by weight, relative to the monomers used to form the latex, preference being given to amounts of about 1 to about 15% by weight, in particular to amounts of about 1 to about 8% by weight.

If desired, the protective colloids according to the invention may generally be used in combination with other protective colloids and/or emulsifiers. Basically, any protective colloids which can in general be employed in emulsion polymerization can be used in combination with the protective colloids according to the invention, provided they are compatible with the protective colloids according to the invention. Examples of protective colloids which are suitable in combination with the protective colloids according to the invention are cellulose derivatives, polyvinylpyrrolidone, polyacrylic acids or polyacrylamide. These protective colloids are preferably additionally used in an amount of up to about 5% by weight, relative to the monomers used to form the latex. Additional emulsifiers may generally be used in amounts of about 0.1 to about 1.5% by weight relative to the monomers used to form the latex. Both ionic and nonionic emulsifiers generally can be used. Suitable anionic emulsifiers are in particular sulfuric esters of fatty alcohols, for example lauryl sulfate, sulfonation products of alkoxylated, in particular ethoxylated, alkylphenols containing in most cases 8 to 12 carbon atoms in the alkyl radical, water-soluble alkali metal salts of fatty acids and sulfonated and alkylated biphenyl ethers. However, other suitable anionic emulsifiers may be used. Examples of nonionic emulsifiers which can be used are alkoxylated, preferably ethoxylated, fatty alcohols, fatty amines, fatty acid amides and/or monoalkylphenols containing in most cases 8 to 12 carbon atoms in the alkyl groups, which compounds generally contain 5 to 30, in particular 10 to 25, ethylene oxide units in the molecule. In addition, any other suitable nonionic emulsifier may be used.

When preparing the dispersions, the protective colloids according to the invention are generally introduced first into a reaction vessel in the form of an aqueous solution, an aqueous emulsion or suspension, although it is also possible to add them entirely or in part to the reaction batch continuously or batchwise during preparation of the dispersions.

Preparation of the dispersion is generally effected by adding ethylenically unsaturated monomers at the desired reaction temperature continuously or batchwise to the protective colloid, protective colloid mixture or protective colloid/emulsifier mixture introduced first entirely or in part into the reaction vessel. Any polymerization initiators forming free radicals can be used in the customary amounts.

Examples of suitable initiators are alkali metal salts and ammonium salts of peroxy acids, such as potassium persulfate, sodium persulfate and ammonium persulfate, and redox catalysts, for example combinations of ammonium persulfate and ammonium hydrogen sulfate or hydrogen peroxide and ascorbic acid and tert.-butyl peroxide and sodium formaldehyde sulfoxylate. Furthermore, organic peroxides, percarbonates and azo compounds, preferably dibenzoyl peroxide, azobisisobutyronitrile, tert.-butyl peroxydiethylacetate or tert.-butyl peroxy-2-ethylhexanoate, and other suitable initiators can also be used. The amount of initiators used is an amount sufficient to initiate the reaction, generally up to about 2%, preferably about 0.1 to about 2%, more preferably about 0.2 to about 1% by weight, relative to the monomers of the latex. The initiators described can also be used in mixtures.

Basically, any ethylenically unsaturated monomers polymerizable by free radicals, such as are commonly used for preparing plastic dispersions, can be used in the preparation of the dispersions of the present invention. Examples of suitable monomers are vinyl carboxylates having 3 to 20 carbon atoms, in particular vinyl acetate, vinyl propionate and vinyl carboxylates having 9 to 11 carbon atoms in the carboxylic acid component. Furthermore, N-vinylpyrrolidone and derivatives thereof, ethylenically unsaturated carboxylic acids, esters thereof, amides thereof or anhydrides thereof, α-olefins, in particular ethylene and propylene, and acrylonitrile may also be used. Particular preference is given to the use of ethylenically unsaturated carboxylic acids, in particular acrylic and methacrylic acid. Ethylenically unsaturated carboxylic esters, in particular acrylic and methacrylic esters having 1 to 12 carbon atoms in the alcohol radical are also particularly preferred. The alcohol radical of the esters can comprise linear or branched alkyl chains, cycloaliphatics or aromatics which may have been additionally modified with hydroxyl groups, halogen atoms or epoxy groups. The use of styrene and styrene derivatives is also particularly preferred.

The monomers can be metered in the form of monomer mixtures or in the form of monomer emulsions. In the case of monomer emulsions, they can be stabilized with protective colloids and/or emulsifiers. The emulsifiers and protective colloids listed above can be used for stabilizing the monomer emulsions. When preparing the dispersions, the initiator systems mentioned above can first be introduced entirely or in part into the reaction vessel, metered in entirely or in part together with the monomer emulsion or metered in entirely or in part parallel to the monomer mixture.

Processes for preparing plastic dispersions are generally known per se. Basically, any preparation processes known from the literature for the synthesis of dispersions using the protective colloids according to the invention can be used. The polymerization is usually carried out up to about 140° C., preferably in a range between about 40° C. and about 140° C., if desired under pressure, preference being given to a temperature range from about 60° C. to about 90° C.

The use according to the present invention of the sulfonato-containing polyvinyl acetals results at least in part in grafting of the sulfonato-containing polyvinyl acetals with the monomers used during the emulsion polymerization process of the dispersion. This modification of the sulfonato-containing polyvinyl acetals has a decisive effect on the properties of the dispersion, in particular the dependence of the viscosity of the dispersion on the pH.

Accordingly, another aspect of the invention provides aqueous dispersions having a pH-dependent viscosity and containing sulfonato-containing polyvinyl acetals as protective colloids, at least one latex polymer prepared by emulsion polymerization in the presence of the sulfonato-containing polyvinyl acetal, in which at least a portion of the sulfonato-containing polyvinyl acetals has undergone grafting with the monomers used for preparing the latex polymer. If desired, further protective colloids and emulsifiers can be provided in the aqueous of dispersing.

The median particle size of the latex particles of the dispersion is generally between about 100 and about 1000 nm, preferably about 150 and about 500 nm. The solids content of the dispersion is generally in the range from about 30 to about 70%, preferably from about 40 to about 60%.

The viscosity of the dispersions according to the invention can be varied over several magnitudes by adjusting the pH of the dispersions in the area of non-Newtonian flow, so that the base dispersions can be adapted to a multitude of different areas of application. If the pH of such a base dispersion is shifted to low pH values, the viscosity of the dispersion decreases, while the viscosity increases if the pH of the base dispersion is shifted to higher values. Thus, the viscosity can generally be adjusted in a pH range generally between about 2 and about 12, preferably about 3 and about 10, over a range from about 10 mPa.s to about 100 Pa.s, depending on the type of dispersion. This enables the user to adjust the specific viscosity profile for his specific application individually in a simple manner. Furthermore, dispersions having extremely high viscosities, preferably of more than 25 Pa.s, can be prepared in this manner.

Surprisingly, the dispersions of the present invention exhibit pronounced structural viscosity independently of their pH. They possess a high shear viscosity of preferably more than 25 Pa.s and a long shelf life.

The invention also relates to the use of the dispersions prepared according to the invention in aqueous binder systems.

The property profile described makes the dispersions containing the protective colloids according to the invention particularly suitable for use as rheology modifiers for a wide range of uses, in particular for aqueous binder systems. Their compatibility can be tailored for each use via the protective colloid/emulsifier system.

The dispersions according to the present invention, in particular pure acrylate dispersions containing sulfonato-containing polyvinyl acetals as protective colloids are also particularly suitable for preparing clear dispersion films. Furthermore, the protective colloid system of the present invention induces good adhesion of the dispersions to a wide range of materials. For this reason, dispersions prepared using the protective colloids according to the present invention are particularly suitable for coating and bonding glass, metals, wood, paper, natural fibers, mineral materials and polymer substrates. Since the viscosities are strongly dependent on the shear rates and moreover can be adjusted via the pH, the dispersions are highly suitable for use in application and processing areas where significantly lower viscosities are required during processing, for example, in sprayable antidrumming compounds, and as binders for solid paints and as binders for water-based glue sticks. The above examples of the uses of the dispersions of the present invention are for illustrative purposes only and should not be construed in any way as limiting the possible uses of the present invention.

EXAMPLES

Parts and percentages in the examples are by weight unless stated otherwise. The term acetal units denotes the following substituent:

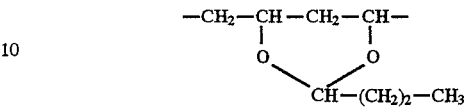

(2-n-propyl-4-methylenyl-1,3-dioxolan-6-yl)

Although butyraldehyde is shown in the substituent as the aldehyde component, butyraldehyde is only preferred. Other aldehydes may also be used.

Determination of viscosity by method 1:
The viscosity of a 10% ethanolic solution was determined at 20° C. in a Höppler viscometer Determination of viscosity by method 2:
The viscosity of the dispersion was determined using a Haake rotating viscometer (Rheomat VT 500) at a shear gradient D of 17.93 s$^{-1}$.

The particle size and particle size distribution were determined by photon correlation spectroscopy using an ALV correlator. The particle size shown was that of the hydrodynamic particle diameter.

EXAMPLE 1

First, the following were provided:
Monomer emulsion prepared from
430 g of water,
15 g of 50% Hostapal® BV (sodium salt of an alkylarylpolyglycol ether sulfate),
88 g of methyl methacrylate,
352 g of 2-ethylhexyl acrylate,
220 g of n-butyl acrylate,
15 g of methacrylic acid,
3.4 g of ammonium persulfate,
Initiator solution comprising
0.35 g of ammonium persulfate
10 g of water.
A 2-liter flask is charged with
370 g of an aqueous dispersion of a polyvinyl butyral containing sodium ethenesulfonate units (analytical data of the sulfonato-containing polyvinyl butyral:
acetal units: 74.1%
vinyl alcohol units: 18.9%
vinyl acetate units: 1.3%
sodium ethenesulfonate units: 5.7%
solids content of the dispersion: 23.7 %),
7.5 g of 50% Hostapal® BV, and
30 g of monomer emulsion.

The initial charge was heated in the reaction vessel to a temperature of 80° C.–85° C. at a rotational speed of 100–250 rpm with stirring. The initiator solution was added at an internal temperature of 50° C.–55° C. After the internal temperature reached 80° C. metered addition of the remaining monomer emulsion was started. Metered addition of the monomer emulsion takes place uniformly over a metering period of 3.5 hours. During the metered addition, the internal temperature should be 82° C.–84° C. at an external temperature of 85° C.–86° C. The after reaction time was 1.5 hours.

Analytical data of the resulting dispersion:
Solids content: 51.7%
Particle size (PS): 225 nm
PS distribution: 1.61
pH: 3.8
Viscosity (method 2): 2.7 Pa.s

EXAMPLE 2

First, the following were provided:
Monomer emulsion prepared from
430 g of an aqueous dispersion of a polyvinyl butyral containing sodium ethenesulfonate units (analytical data of the sulfonato-containing polyvinyl butyral:
acetal units: 74.1%
vinyl alcohol units: 18.9%
vinyl acetate units: 1.3%
sodium ethenesulfonate units: 5.7%
viscosity (method 1): 58.5 mPa.s
solids content of the dispersion: 23.7 %)
50 g of 50% Hostapal® BV,
88 g of methyl methacrylate,
352 g of 2-ethylhexyl acrylate,
220 g of n-butyl acrylate,
15 g of methacrylic acid, and
3.4 g of ammonium persulfate.
Initiator solution comprising
0.35 g of ammonium persulfate, and
10 g of water.
A 2-liter flask is charged with:
370 g of an aqueous dispersion of a polyvinyl butyral containing sodium ethenesulfonate units (analytical data of the sulfonato-containing polyvinyl butyral:
acetal units: 74.1%
vinyl alcohol units: 18.9%
vinyl acetate units: 1.3%
sodium ethenesulfonate units: 5.7%
viscosity (method 1): 58.5 mPa.s
solids content of the dispersion: 23.7 %),
7.5 g of 50% Hostapal® BV, and
30 g of monomer emulsion.
The polymerization procedure was the same as that described in Example 1.
Analytical data of the resulting dispersion:
Solids content: 52.7%
Particle size (PS): 200 nm
PS distribution: 2.01
pH: 4.6
Viscosity (method 2): 24.5 Pa.s

EXAMPLE 3

First, the following were provided:
Monomer mixture prepared from
72 g of methyl methacrylate,
290 g of 2-ethylhexyl acrylate,
180 g of n-butyl acrylate,
15 g of methacrylic acid, and
3.4 g of ammonium persulfate.
Initiator solution I comprising
0.35 g of ammonium persulfate and
10 g of water.
Initiator solution II comprising
3.4 g of ammonium persulfate and
20 g of water.
A 2-liter flask is charged with
800 g of an aqueous dispersion of a polyvinyl butyral containing sodium ethenesulfonate units (analytical data of the sulfonato-containing polyvinyl butyral:
acetal units: 73.3%
vinyl alcohol units: 18.9%
vinyl acetate units: 1.2%
sodium ethenesulfonate units: 6.6%
viscosity (method 1): 69.0 mPa.s
solids content of the dispersion: 22.8%), and
30 g of monomer mixture.
The initial charge was heated in the reaction vessel to a temperature of 80° C.–85° C. at a rotational speed of 100–250 rpm with stirring. The initiator solution was added at an internal temperature of 50° C.–55° C. After the internal temperature reached 80° C., metered addition of the monomer mixture was started. Initiator solution II was metered in. Metered addition of the remaining monomer mixture took place uniformly over a metering period of 3.5 hours. During the metered addition, the internal temperature should be 82° C.–84° C. at an external temperature of 85° C.–86° C. The after reaction time was 1.5 hours.
Analytical data of the resulting dispersion:
Solids content: 54.1%
Particle size (PS): 275 nm
PS distribution: 2.37
pH: 4.6
Viscosity (method 2): 32 Pa.s

EXAMPLE 4

First, the following were provided:
Monomer emulsion prepared from
430 g of water,
15 g of 50% Hostapal® BV,
88 g of styrerie,
352 g of 2-ethylhexyl acrylate,
220 g of n-butyl acrylate,
15 g of methacrylic acid, and
3.4g of ammonium persulfate.
Initiator solution comprising
0.35 g of ammonium persulfate and
10 g of water.
A 2-liter flask is charged with
370 g of an aqueous dispersion of a polyvinyl butyral containing sodium ethenesulfonate units (analytical data of the sulfonato-containing polyvinyl butyral:
acetal units: 74.1%
vinyl alcohol units: 18.9%
vinyl acetate units: 1.3%
sodium ethenesulfonate units: 5.7%
viscosity (method 1): 58.5 mPa.s
solids content of the dispersion: 23.7%),
7.5 g of 50% Hostapal® BV, and
30 g of monomer emulsion.
The polymerization procedure was the same as that described in Example 1.

Analytical data of the resulting dispersion:
Solids content: 51.6%
Particle size (PS): 250 nm
PS distribution: 2.13
pH: 4.0
Viscosity (method 2): 5.4 Pa.s

EXAMPLE 5

First, the following were provided:
Monomer emulsion prepared from
430 g of an aqueous dispersion of a polyvinyl butyral containing sodium ethenesulfonate units (analytical data of the sulfonato-containing polyvinyl butyral:
acetal units: 74.1%
vinyl alcohol units: 18.9%
vinyl acetate units: 1.3%
sodium ethenesulfonate units: 5.7%
viscosity (method 1): 58.5 mPa.s
solids content of the dispersion: 23.7%),
140 g of methyl methacrylate,
220 g of ethylhexyl acrylate,
180 g of n-butyl acrylate,
15 g of acrylic acid, and
3.4 g of sodium persulfate.
Initiator solution comprising
0.35 g of ammonium persulfate
10 g of water.
A 2-liter flask is charged with
370 g of an aqueous dispersion of a polyvinyl butyral containing sodium ethenesulfonate units (analytical data of the sulfonato-containing polyvinyl butyral:
acetal units: 74.1%
vinyl alcohol units: 18.9%
vinyl acetate units: 1.3%
sodium ethenesulfonate units: 5.7%
viscosity (method 1): 58.5 mPa.s solids content of the dispersion: 23.7%), and 30 g of monomer emulsion.

The polymerization procedure was the same as that described in Example 1.

Analytical data of the resulting dispersion:
Solids content: 54.9%
Particle size (PS): 250 nm
PS distribution: 2.19
pH: 4.4
Viscosity (method 2): 29.1 Pa.s Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. An aqueous latex dispersion having a pH-dependent viscosity, comprising:
sulfonato-containing polyvinyl acetals as a protective colloid, wherein the sulfonato-containing polyvinylacetals are prepared by acetalization of sulfonato-containing polyvinyl alcohol with an aldehyde, and wherein at least a portion of said sulfonato-containing polyvinyl acetals have vinyl monomer units grafted thereto; and
at least one latex polymer containing vinyl monomer units, and wherein said grafted vinyl monomer units are identical to at least one of said vinyl monomer units of said at least one latex polymer.

2. An aqueous dispersion as claimed in claim 1, further comprising at least one of an additional emulsifier and an additional protective colloids.

3. An aqueous dispersion as claimed in claim 1, wherein the viscosity of said dispersion is a function of the pH of said dispersion, and said pH ranges from about 10 mPa.s to about 100 Pa.s as the pH ranges from about 2 to about 12.

4. An aqueous latex dispersion having a pH-dependent viscosity, said dispersion formed by a process comprising:
forming a dispersion of vinyl monomers and a protective colloid including sulfonato-containing polyvinyl acetals in a reaction system wherein the sulfonato-containing polyvinylacetals are prepared by acetalization of sulfonato-containing polyvinyl alcohol with an aldehyde; and
emulsion polymerizing said vinyl monomers in the presence of said protective colloid to produce a latex dispersion stabilized with said protective colloid, wherein at least a part of said vinyl monomers are grafted onto said sulfonato-containing polyvinyl acetals.

5. A process for coating or bonding a substrate selected from the group consisting of glass, metals, wood, paper, natural fibers, mineral materials and polymer substrates, comprising applying a coating composition containing the aqueous dispersion having a pH-dependent viscosity according to claim 1 to said substrate.

6. A process for preparing an aqueous latex dispersion stabilized with a protective colloid as claimed in claim 1, comprising:
forming a dispersion of vinyl monomers and a protective colloid including sulfonato-containing polyvinyl acetals in a reaction system wherein the sulfonato-containing polyvinylacetals are prepared by acetalization of sulfonato-containing polyvinyl alcohol with an aldehyde; and
emulsion polymerizing said vinyl monomers in the presence of said protective colloid to produce a latex dispersion stabilized with said protective colloid, wherein at least a part of said vinyl monomers are grafted onto said sulfonato-containing polyvinyl acetals.

7. A process as claimed in claim 6, further comprising dispersing at least one of an additional emulsifier and an additional protective colloid with said vinyl monomer and protective colloid including sulfonato-containing polyvinyl acetals in said reaction system.

8. A process as claimed in claim 6, wherein the sulfonato-containing polyvinyl acetals are produced by acetalization of sulfonato-containing polyvinyl alcohol with an aldehyde.

9. A process as claimed in claim 6, wherein the sulfonato-containing polyvinyl acetals contain up to about 70 mol % of vinyl alcohol units, up to about 84 mol % of vinyl acetal units, up to about 20 mol % of sulfonate units ($-SO_3$) and up to about 20 mol % of vinyl acetate units.

10. A process as claimed in claim 8, wherein the aldehydes used for acetalization of the sulfonato-containing polyvinyl alcohols are selected from the group consisting of aliphatic, aromatic and cycloaliphatic aldehydes, each having up to 20 carbon atoms and mixtures thereof.

11. A process as claimed in claim 10, wherein the aldehyde used for acetalization of the sulfonato-containing polyvinyl alcohol is butyraldehyde.

12. A process as claimed in claim 6, wherein the sulfonato-containing polyvinyl acetals are used in amounts of up to about 25% by weight, relative to the weight of the vinyl monomers.

13. A process as claimed in claim 7, wherein the additional emulsifier is selected from the group consisting of anionic emulsifiers, nonionic emulsifiers and mixtures thereof and said additional emulsifier is used in amount of up to about 1.5% by weight, relative to the weight of the vinyl monomers.

14. A process as claimed in claim 7, wherein the further protective colloid is used in amounts of up to about 5% by weight, relative to the weight of the vinyl monomers used.

15. A process as claimed in claim 6, wherein the vinyl monomers are selected from the group consisting of vinyl carboxylates having 3 to 20 carbon atoms, N-vinyl-pyrrolidone and derivatives thereof, ethylenically unsaturated carboxylic acids, esters thereof, anhydrides thereof or amides thereof, α-olefins, acrylonitrile, styrene or styrene derivatives and mixtures thereof.

16. A process as claimed in claim 6, wherein the vinyl monomers are selected from the group consisting of acrylic esters, methacrylic esters and mixtures thereof having 1 to 12 carbon atoms in the alcohol radical, and wherein the alcohol radical of the esters are selected from the group consisting of linear or branched alkyl chains, cycloaliphatic, aromatic radicals and mixtures thereof.

17. A process as claimed in claim 16, wherein the alcohol radical has been modified with at least one of hydroxyl groups, halogen atoms and epoxy groups.

18. A process as claimed in claim 6, further comprising combining an initiator with said vinyl monomers and protective colloid, and wherein said initiators are used in amounts of up to about 2% by weight, relative to the weight of the vinyl monomers.

19. A process as claimed in claim 18, wherein the initiators are selected from the group consisting of alkali metal salts, ammonium salts of peroxy acids, redox catalysts, organic peroxides, organic azo compounds, organic percarbonates and mixtures thereof.

20. The process as claimed in claim 6, wherein the protective colloids are first introduced entirely or in part into a reaction vessel or are metered in continuously entirely or in part during polymerization in pure form or in a mixture with the vinyl monomers and the polymerization is carried out at temperatures of up to 140° C., if desired under pressure.

21. The process as claimed in claim 6, wherein the vinyl monomers used in the preparation of the dispersions are first introduced entirely or in part into the reaction vessel or are metered in continuously or batchwise entirely or in part during polymerization in pure form or in a mixture.

22. A process for preparing an aqueous latex dispersion stabilized with a protective colloid, comprising:

forming a dispersion of vinyl monomers and a protective colloid including ethenesulfonate units-containing polyvinyl acetals in a reaction system wherein the ethenesulfonate units-containing polyvinylacetals are prepared by acetalization of an ethenesulfonate units-containing polyvinyl alcohol with an aldehyde; and emulsion polymerizing said vinyl monomers in the presence of said protective colloid to produce a latex dispersion stabilized with said protective colloid, wherein at least a part of said vinyl monomers are grafted onto said ethenesulfonate units-containing polyvinyl acetals.

23. An aqueous latex dispersion having a pH-dependent viscosity, comprising:

ethenesulfonate units-containing polyvinyl acetals as a protective colloid, wherein the ethenesulfonate units-containing polyvinylacetals are prepared by acetalization of an ethenesulfonate units-containing polyvinyl alcohol with an aldehyde, and wherein at least a portion of said ethenesulfonate units-containing polyvinyl acetals have vinyl monomer units grafted thereto; and at least one latex polymer containing vinyl monomer units, and wherein said grafted vinyl monomer units are identical to at least one of said vinyl monomer units of said at least one latex polymer.

* * * * *